UNITED STATES PATENT OFFICE.

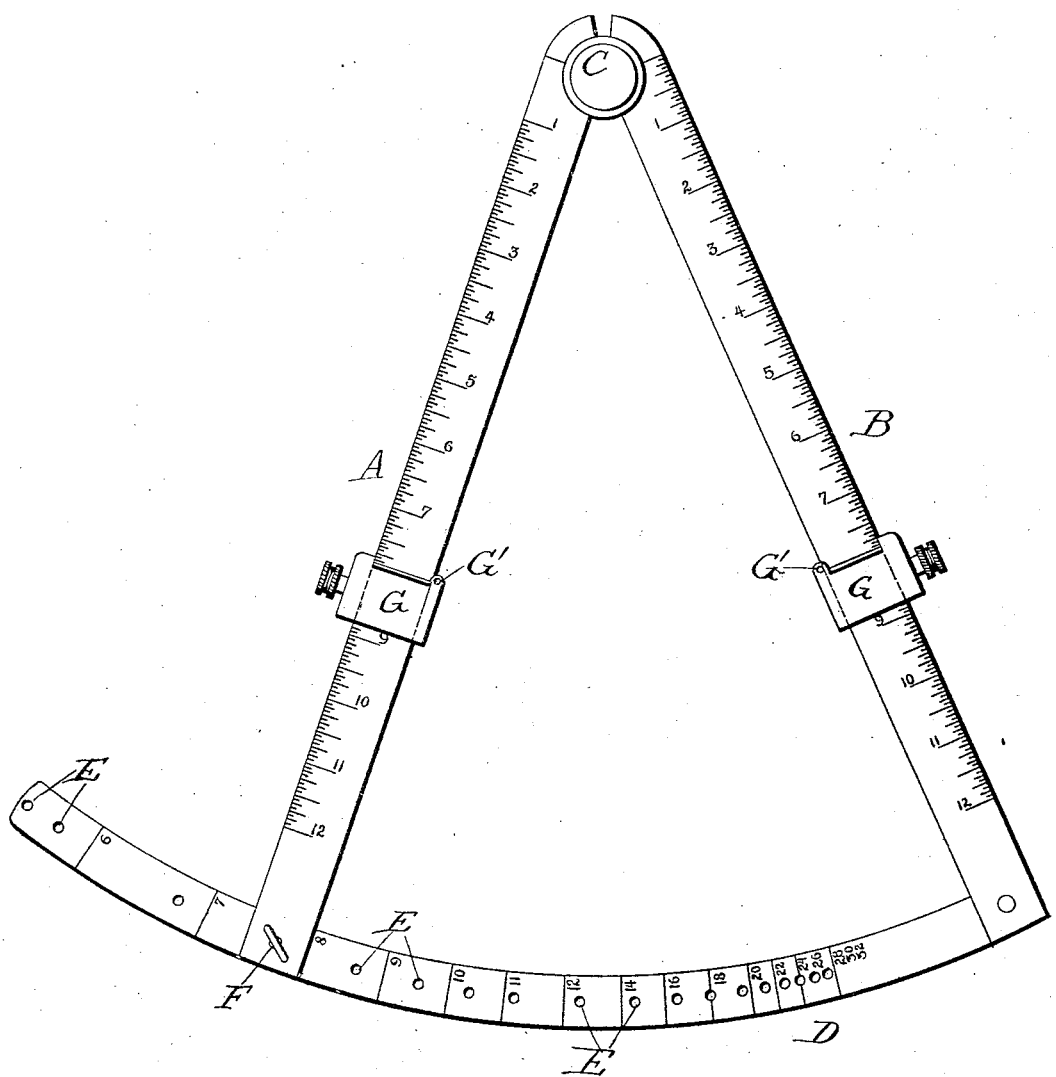

GUSTAVE J. LUCK, OF MILWAUKEE, WISCONSIN, ASSIGNOR OF ONE-HALF TO ALLIS-CHALMERS COMPANY, OF CHICAGO, ILLINOIS, A CORPORATION OF NEW JERSEY.

MEASURING INSTRUMENT.

SPECIFICATION forming part of Letters Patent No. 704,263, dated July 8, 1902.

Application filed December 16, 1901. Serial No. 86,132. (No model.)

*To all whom it may concern:*

Be it known that I, GUSTAVE J. LUCK, a citizen of the United States, residing at Milwaukee, in the county of Milwaukee and State of Wisconsin, have invented certain new and useful Improvements in Measuring Instruments, of which the following is a specification.

My present invention pertains to improvements in measuring instruments, the construction and advantages of which will be hereinafter pointed out in detail, reference being had to the annexed drawing, wherein a face view of the instrument is shown.

The object of the invention is to provide an instrument or scale by which chords for any angle and for any radius may be readily determined, whereby, for instance, a circle of a given radius may be evenly divided up or spaced off as required. The instrument is especially applicable for use in determining the position of bolt-holes in cylinder-heads and the like.

Referring to the drawing, A and B indicate two arms pivotally connected to each other at C. Attached to the outer end of arm B is a sector-plate or arm D, over which arm A passes. Sector-plate D is provided with a series of graduations or numbers—as, for instance, from "6" to "32"—and holes E are formed in the plate and so positioned with reference to said numbers that when arm A is swung around over the sector it may be secured thereto in proper position with relation to any one of said numbers or graduations by a pin F, mounted in the outer end of the arm A, said pin passing down through the adjacent opening E.

Mounted upon each of the arms or radius-bars A and B is a sliding block G, provided with a thumb-screw for holding it in its adjusted position upon the bar. Each block is provided with a center punch-mark or seat, as G', said seat being preferably in line with the inner edge of the bar. The radius-bars or arms A and B may, if desired, be graduated, as shown, to determine the distance of the blocks from the pivotal point of the bars, or, in other words, the length of the radius of the circle. If preferred, however, the distance of the blocks from the pivotal point of the radius-bars may be laid off and determined by the use of a single-shrink or double-shrink rule.

In use the blocks are set at any desired distance along the radius-bars from the pivotal point thereof and fixed in such position. Arm A is then swung over the sector-bar until it is brought to the notation corresponding to the number of spaces into which it is desired to divide the circle and is then fastened. The distance between the center punch-marks or seats G' will be the chord which will divide the circle of the given radius into the desired number of spaces. The center punch-marks facilitate the use of dividers in taking and transferring the measurement.

It is manifest that the construction of the device may be varied from that illustrated. For instance, the sector-plate or scale may be made integral with arm B and may be curved, as shown, or straight. So, too, any suitable fastening means other than the pin and holes may be employed for securing arm A in its adjusted position.

Having thus described my invention, what I claim is—

1. In an instrument of the character described, the combination of a pair of arms pivotally connected together at one end; a scale-plate carried by the outer end of one of said arms; means for securing the other arm to said plate in its desired adjusted position; and blocks slidably mounted upon the arms, said blocks being provided with seats or center punch-marks which come into alinement with the graduations on the scale-plate when the parts are adjusted, substantially as described.

2. In an instrument of the character described, the combination of a pair of arms pivotally connected together at one end, said arms being graduated; a block slidably mounted upon each of said arms, said blocks being provided with a seat or center punch-mark; means for securing the blocks in their adjusted position; a scale-plate carried by one of said arms; and means for securing the other arm to said plate in any desired adjustment.

In testimony whereof I have signed my name to this specification in the presence of two subscribing witnesses.

GUSTAVE J. LUCK.

Witnesses:
B. A. BRENNAN,
G. M. HUBBARD.